United States Patent
Kinoshita et al.

(10) Patent No.: US 9,014,969 B2
(45) Date of Patent: Apr. 21, 2015

(54) GUIDANCE SYSTEM, SERVER, TERMINAL DEVICE, AND GUIDANCE METHOD

(71) Applicant: Alpine Electronics, Inc., Tokyo (JP)

(72) Inventors: Kosuke Kinoshita, Iwaki (JP); Kenji Shida, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 0 days.

(21) Appl. No.: 14/143,404

(22) Filed: Dec. 30, 2013

(65) Prior Publication Data

US 2014/0200803 A1 Jul. 17, 2014

(30) Foreign Application Priority Data

Jan. 11, 2013 (JP) .................................. 2013-003823

(51) Int. Cl.
*G01C 21/36* (2006.01)

(52) U.S. Cl.
CPC .................................. *G01C 21/3676* (2013.01)

(58) Field of Classification Search
USPC .......................................................... 701/428
See application file for complete search history.

(56) References Cited

U.S. PATENT DOCUMENTS

| 2011/0291860 A1 | 12/2011 | Ozaki et al. | |
| 2011/0291863 A1* | 12/2011 | Ozaki et al. | 340/995.14 |

FOREIGN PATENT DOCUMENTS

| JP | 2003-240582 | 8/2003 |
| JP | 2011-247832 | 12/2011 |

* cited by examiner

*Primary Examiner* — Mary Cheung
*Assistant Examiner* — Anne Mazzara
(74) *Attorney, Agent, or Firm* — Brinks Gilson & Lione

(57) ABSTRACT

A guidance system includes an SNS server that distributes guidance information, e.g., to a smartphone. The SNS server includes a post information DB, a map DB, and a guidance information DB. Pieces of post information and selected guidance information are transmitted to the smartphone via a communication unit. The smartphone displays the pieces of post information, and includes a setting unit that sets, as a destination, a location contained in a piece of post information among the displayed pieces of post information, and a guidance unit that provides, by using the guidance information, guidance on a guidance route to the destination.

16 Claims, 12 Drawing Sheets

| CONTRIBUTOR ID | POST DATE AND TIME | POST CONTENT | POST LOCATION INFORMATION |
|---|---|---|---|
| P1 | | | |
| P1 | | | |
| ... | | | |
| P1 | | | |

| CONTRIBUTOR ID | POST DATE AND TIME | POST CONTENT | POST LOCATION INFORMATION | FLAG |
|---|---|---|---|---|
| P3 | 15:15 ON 11/28 | | Xa, Ya | |
| P1 | 17:30 ON 11/28 | | Xb, Yb | |
| P2 | 09:10 ON 11/29 | | Xa, Ya | |
| Pn | 09:30 ON 11/29 | | Xn, Yn | |
| ... | ... | ... | ... | |
| P3 | 09:35 ON 11/29 | | NONE | |

FIG. 8A

| CONTRIBUTOR ID | GUIDANCE DIRECTION | IMAGE FILE | AUDIO FILE |
|---|---|---|---|
| P1 | RIGHT | Img-P1-right | Audio-P1-right |
| | STRAIGHT | Img-P1-straight | Audio-P1-straight |
| | LEFT | Img-P1-left | Audio-P1-left |
| P2 | RIGHT | Img-P2-right | Audio-P2-right |
| | STRAIGHT | Img-P2-straight | Audio-P2-straight |
| | LEFT | Img-P2-left | Audio-P2-left |
| ... | ... | ... | ... |
| Pn | RIGHT | Img-Pn-right | Audio-Pn-right |
| | STRAIGHT | Img-Pn-straight | Audio-Pn-straight |
| | LEFT | Img-Pn-left | Audio-Pn-left |

FIG. 8B

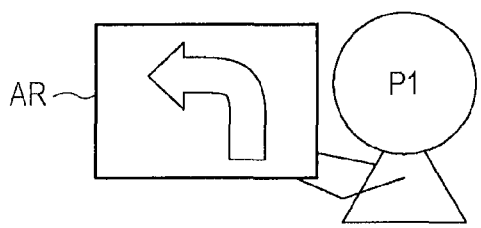

FIG. 8D

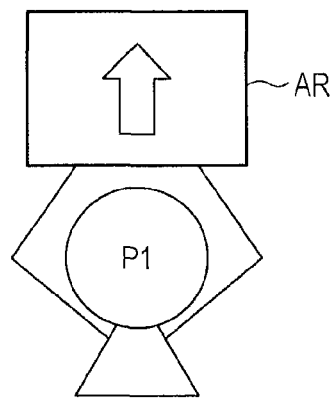

FIG. 8C

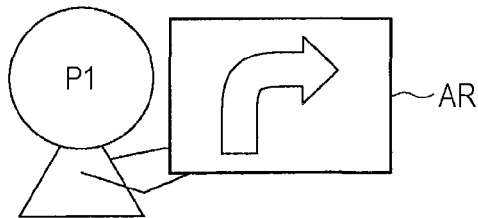

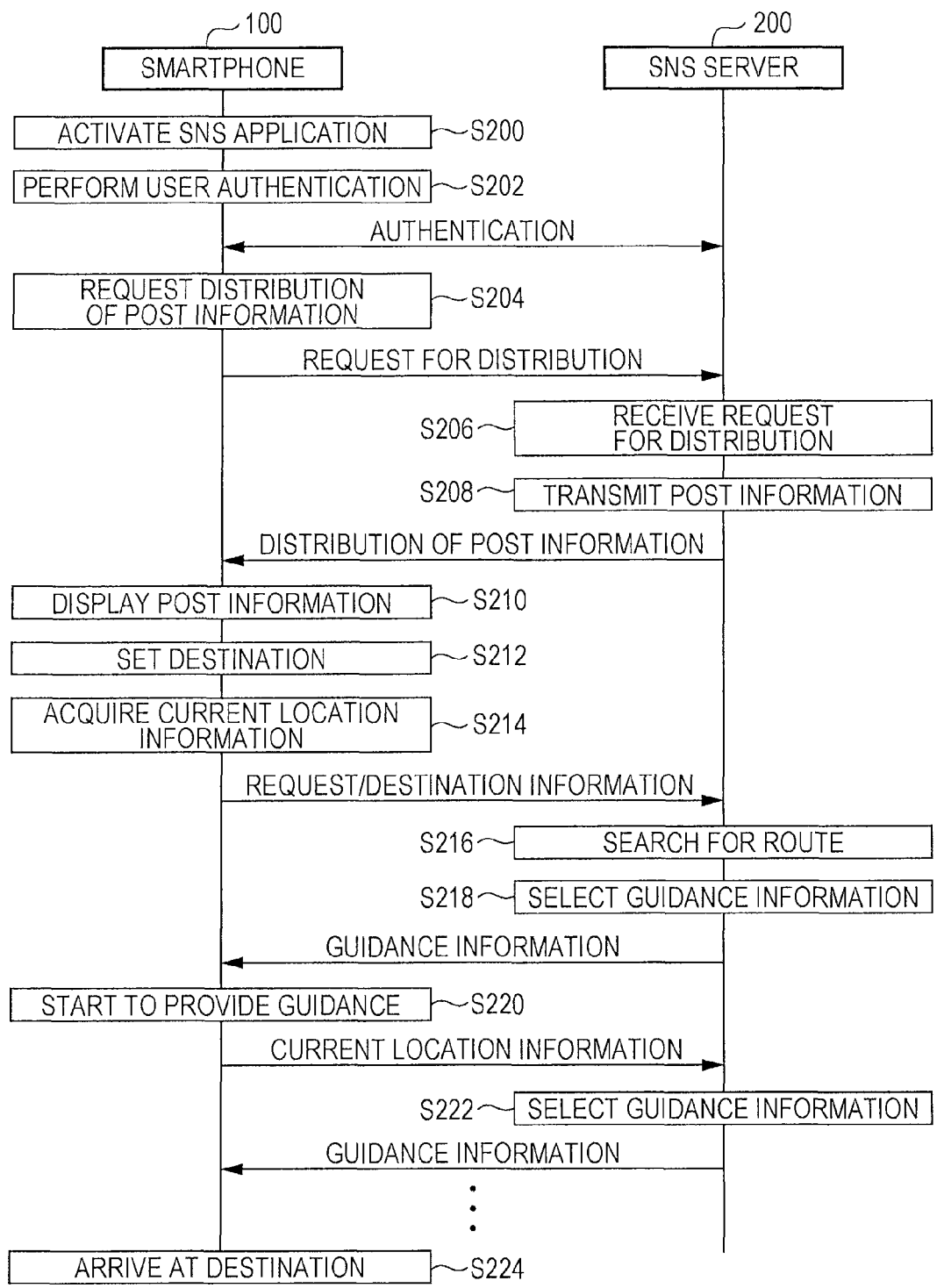

| GUIDANCE POINT | GUIDANCE DIRECTION |
|---|---|
| A1 | STRAIGHT |
| A2 | RIGHT TURN |
| A3 | LEFT TURN |
| A4 | ARRIVAL AT DESTINATION |

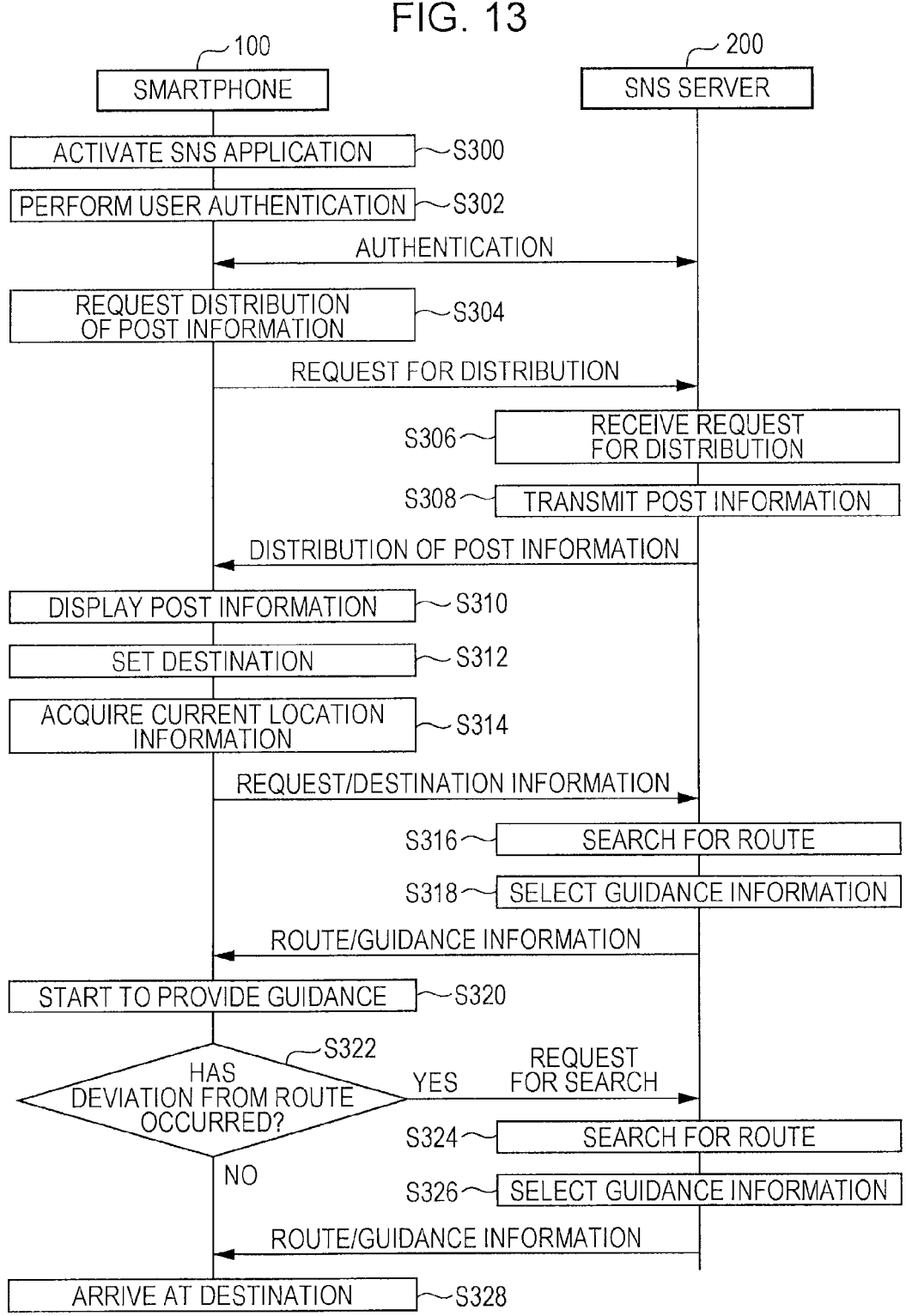

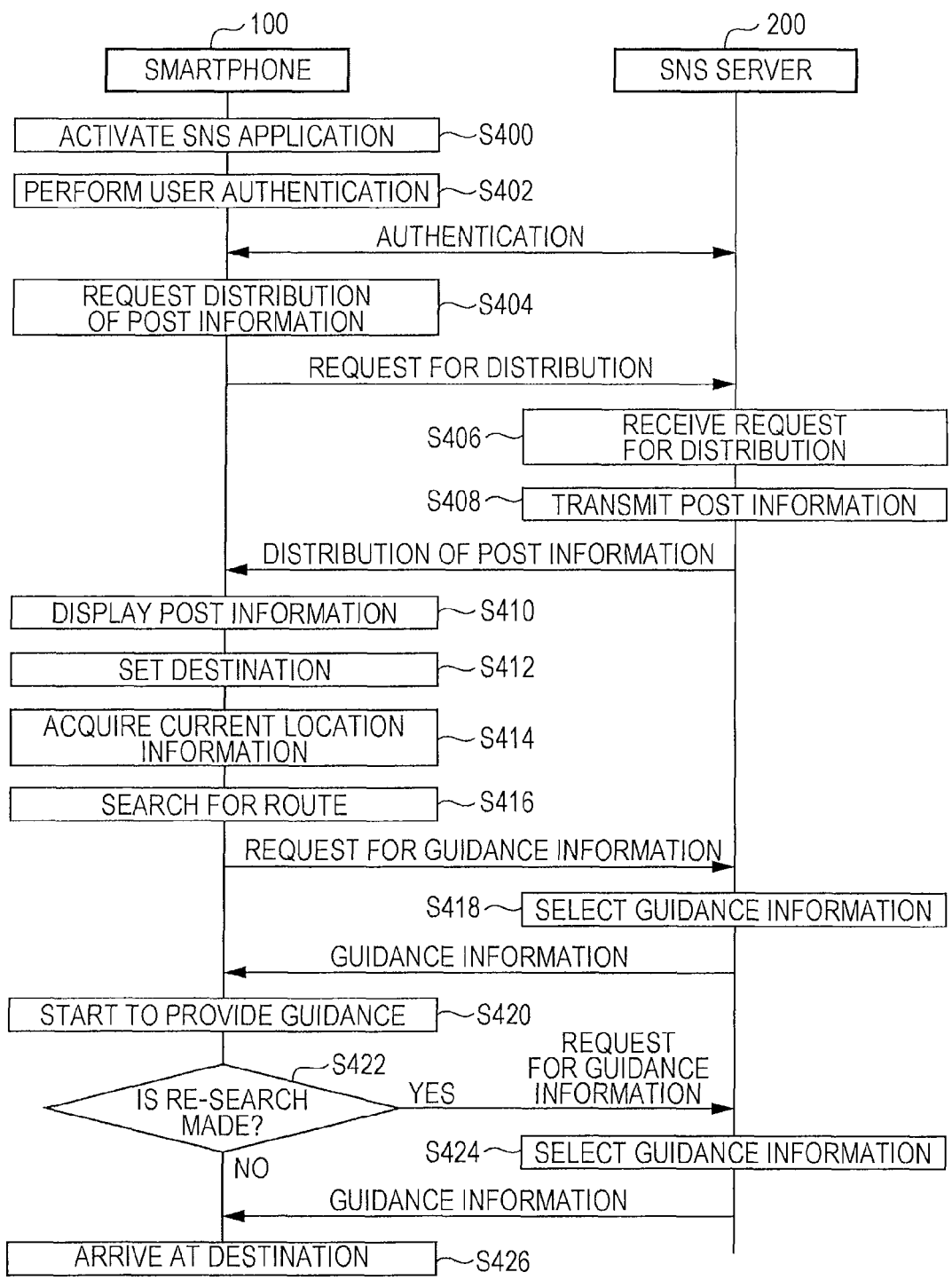

GUIDANCE SYSTEM, SERVER, TERMINAL DEVICE, AND GUIDANCE METHOD

RELATED APPLICATIONS

The present application claims priority to Japanese Patent Application Number 2013-003823, filed Jan. 11, 2013, the entirety of which is hereby incorporated by reference.

BACKGROUND OF THE INVENTION

1. Field of the Invention

The present invention relates to a guidance system that provides guidance on a route to a location contained in post information posted by a contributor, a server, a terminal device, a guidance method, and a program.

2. Description of the Related Art

Various services that utilize communication performed by mobile multi-function terminals and the like typified by smartphones have been developed. In recent years, in particular, social networking services (hereinafter referred to as SNSs), such as Twitter (registered trademark) and Facebook (registered trademark), have been widely used. In an SNS, the user posts various pieces of information by using a smartphone, a mobile phone, a personal computer (hereinafter referred to as PC), or the like, the posted pieces of information are accumulated on an SNS server, and the user is able to browse the pieces of information accumulated on the SNS server. Because the user is able to associate a location at which a post is made with the content of the post upon making the post, there is accumulated, on the SNS server, post information containing an account for identifying a contributor, a post date and time, location information representing the location at which the post has been made, the content of the post, and the like.

There has been a demand for continuous use of an SNS, which the user makes use of with a mobile terminal, such as a mobile phone, in a vehicle after the user has entered the vehicle. There is disclosed an in-vehicle display apparatus that displays, on a map, post information acquired from an SNS server in a display format based on an elapsed time from when the post information is posted to when the post information is acquired and a category to which the post information belongs (Japanese Unexamined Patent Application Publication No. 2011-247832). Also, there is disclosed, for example, a navigation apparatus in which appropriate pieces of audio data, such as guidance information, up-to-date information, and sound effects, based on information on the current location of a vehicle are searched for from a database of an external server, downloaded to a vehicle-location display apparatus via the Internet, and output by sound at a point at which route guidance is to be provided (Japanese Unexamined Patent Application Publication No. 2003-240582).

In a route guidance function of a navigation apparatus, guidance is typically provided by using a map. However, a service using such a technique differs significantly from a service that provides post information, such as word-of-mouth information, in terms of a world view. Thus, the existing guidance technique has a problem that it is difficult to provide a consistent service in a world view common with a service or the like that provides post information.

Embodiments of the present invention solves such this problem, and an object thereof is to provide a guidance system, a server, a terminal device, a guidance method, and a program which enable guidance to be provided by using the world view of a service that provides, for example, post information, such as word-of-mouth information.

SUMMARY

An embodiment of the present invention provides a guidance system including a server that is capable of distributing guidance information and a terminal device that provides the guidance information from the server. The server includes a receiving unit that receives pieces of post information which are each posted by a contributor and each contain at least information on a location, an accumulation unit that accumulates the received pieces of post information, a storage unit that stores guidance information which contains image information representing an appearance of the contributor or audio information of the contributor, a selection unit that selects the guidance information, and a transmitting unit that transmits, to the terminal device, the pieces of post information and the guidance information selected by the selection unit. The terminal device includes a request unit that makes a request to the server for transmission of the pieces of post information and the guidance information, a post information display unit that displays the pieces of post information which have been transmitted by the transmitting unit in response to the request unit, a setting unit that sets, as a destination, a location contained in a piece of post information among the displayed pieces of post information, and a guidance unit that provides, by using the guidance information, guidance on a guidance route to the location set as the destination. The selection unit preferably selects guidance information of a contributor of the piece of post information containing information on the location set as the destination by the setting unit. The terminal device preferably includes an input unit that receives an input from a user, and the selection unit preferably selects guidance information of a contributor selected via the input unit. The guidance information preferably contains the image information or the audio information for each of guidance directions, and the selection unit preferably selects image information or audio information of an appropriate guidance direction in accordance with the guidance route. The server preferably includes a search unit that searches for the guidance route to the location set as the destination by the setting unit. The selection unit preferably selects guidance information in accordance with the guidance route searched for by the search unit. The transmitting unit preferably transmits, at one time, the guidance route searched for by the search unit and all pieces of guidance information to the destination. The search unit preferably monitors a current location of the terminal device, and, when the current location of the terminal device deviates from the guidance route, the search unit preferably re-searches for a guidance route to the destination, and the selection unit preferably selects guidance information in accordance with the guidance route that is re-searched. The terminal device preferably further includes a retaining unit that retains the guidance information, and, when guidance information of a contributor of the piece of post information containing information on the location set as the destination by the setting unit is not contained in the retaining unit, the request unit preferably makes a request to the server for transmission of the guidance information of the contributor, and the selection unit preferably selects the guidance information in response to the request. The terminal device preferably further includes a search unit that searches for the guidance route to the location set as the destination by the setting unit. The image information preferably contains a still image containing both a face of the contributor and a guidance direction. The contributor is preferably a predetermined person.

Another embodiment of the present invention provides a server that distributes guidance information to a terminal device. The server includes: a receiving unit that receives pieces of post information which are each posted by a contributor and each contain at least information on a location; an accumulation unit that accumulates the received pieces of post information; a storage unit that stores guidance information which contains image information representing an appearance of the contributor or audio information of the contributor; a selection unit that selects the guidance information; and a transmitting unit that transmits, to the terminal device, the pieces of post information and the guidance information selected by the selection unit. The selection unit selects guidance information to be provided on a guidance route to a location that has been set as a destination by the terminal device and is contained in a piece of post information. The selection unit preferably selects guidance information of a contributor of the piece of post information containing information on the location set as the destination.

Another embodiment of the present invention provides a terminal device that is capable of providing guidance information distributed from a server. The terminal device includes: a request unit that makes a request to the server for transmission of pieces of post information which each contain at least information on a location, and guidance information; a post information display unit that displays pieces of post information which have been transmitted by the server in response to the request unit; a setting unit that sets, as a destination, a location contained in a piece of post information among the displayed pieces of post information; and a guidance unit that provides, by using guidance information transmitted by the server, guidance on a guidance route to the location set as the destination. The guidance information contains image information representing an appearance of a contributor of the piece of post information containing information on the location set as the destination, or audio information of the contributor.

Another embodiment of the present invention provides a guidance method of a guidance system including a server that is capable of distributing guidance information and a terminal device that provides the guidance information from the server. The guidance method includes the steps of: with the server, (a) receiving pieces of post information which are each posted by a contributor and each contain at least information on a location; (b) accumulating the received pieces of post information; (c) storing guidance information which contains image information representing an appearance of the contributor or audio information of the contributor; (d) selecting the guidance information; (e) transmitting, to the terminal device, the pieces of post information and the selected guidance information; with the terminal device, (f) making a request to the server for transmission of the pieces of post information and the guidance information; (g) displaying the pieces of post information which have been transmitted by the step (e) in response to the step (f); (h) setting, as a destination, a location contained in any piece of post information among the displayed pieces of post information; and (i) providing, by using the guidance information, guidance on a guidance route to the location set as the destination.

Another embodiment of the present invention provides a program executed by a terminal device capable of displaying guidance information distributed from a server. The program causes the terminal device to execute the steps of: (a) making a request to the server for transmission of pieces of post information which each contain at least information on a location, and guidance information; (b) receiving and displaying pieces of post information which have been transmitted by the server in response to step (a); (c) setting, as a destination, a location contained in a piece of post information among the displayed pieces of post information; (d) receiving, from the server, image information representing an appearance of a contributor of the piece of post information containing information on the location set as the destination, or audio information of the contributor; and (e) providing, by using the image information or the audio information, guidance on a guidance route to the location set as the destination.

According to embodiments of the present invention, when a location contained in post information is set as a destination, guidance on a guidance route to the destination is provided by using image information or audio information of a contributor, so that a guidance service having a world view common with a service that provides the post information may be provided to the user.

BRIEF DESCRIPTION OF THE DRAWINGS

FIG. 8A illustrates an example of a guidance information database, and FIGS. 8B to 8D each illustrate an example of an image file of a guidance direction;

FIG. 9 is a flowchart illustrating operations performed by the guidance system according to the first embodiment of the present invention;

FIG. 13 is a flowchart illustrating operations performed by the guidance system according to a second embodiment of the present invention; and FIG. 14 is a flowchart illustrating operations performed by the guidance system according to a third embodiment of the present invention.

DESCRIPTION OF THE PREFERRED EMBODIMENTS

Embodiments of the present invention will be described in detail below with reference to the drawings. A terminal device used in a guidance system according to the present invention may be a smartphone (multi-function mobile phone), a mobile phone, a notebook PC, a tablet PC, a personal computer, or another electronic apparatus equipped with a communication function. The terminal device has a function of outputting, by using a communication function, post information distributed from a server and guidance information representing a guidance route to a location which is referred to by the post information. The user may use the terminal device according to the present invention while walking or in a moving object, such as a vehicle. In the case of use in the moving object, the terminal device is capable of interacting with an in-vehicle device mounted in the moving object. Furthermore, the terminal device according to the present invention may have a function of posting post information, a navigation function, a function of playing audio and video data, a function of receiving television and radio broadcasts, and so forth, in addition to a function of displaying post information and guidance information on a guidance route.

A server used in the guidance system according to the present invention is connected to a network, such as the Internet or an intranet, compiles databases of post information posted by contributors and guidance information of the contributors themselves, and distributes the post information and the guidance information to users who have accessed the server. Preferably, the contributors are predetermined persons or celebrities, and the post information and the guidance information that are provided by these contributors are distributed to the users. Examples of the celebrities include famous persons living all over the country or in a specific region, persons in a specific age group, persons having expertise in a specific thing, and persons who are popular all over the country or in a specific region. Note that the contributors are not necessarily limited to such celebrities and may be ordinary people.

A format or the like of post information posted by a contributor is optional. Preferably, the post information contains identification information for identifying the contributor, the content of the post, location information on a location at which the contributor makes the post or a location contained in the content of the post, and a post date and time. Note that addition of the location information is optional and the contributor may omit the location information as appropriate. Preferably, the identification information for identifying the contributor may contain a still image or moving image of the contributor. When the post information is displayed on the terminal device, the still image or moving image of the contributor may be displayed.

Embodiments

Figure 1:
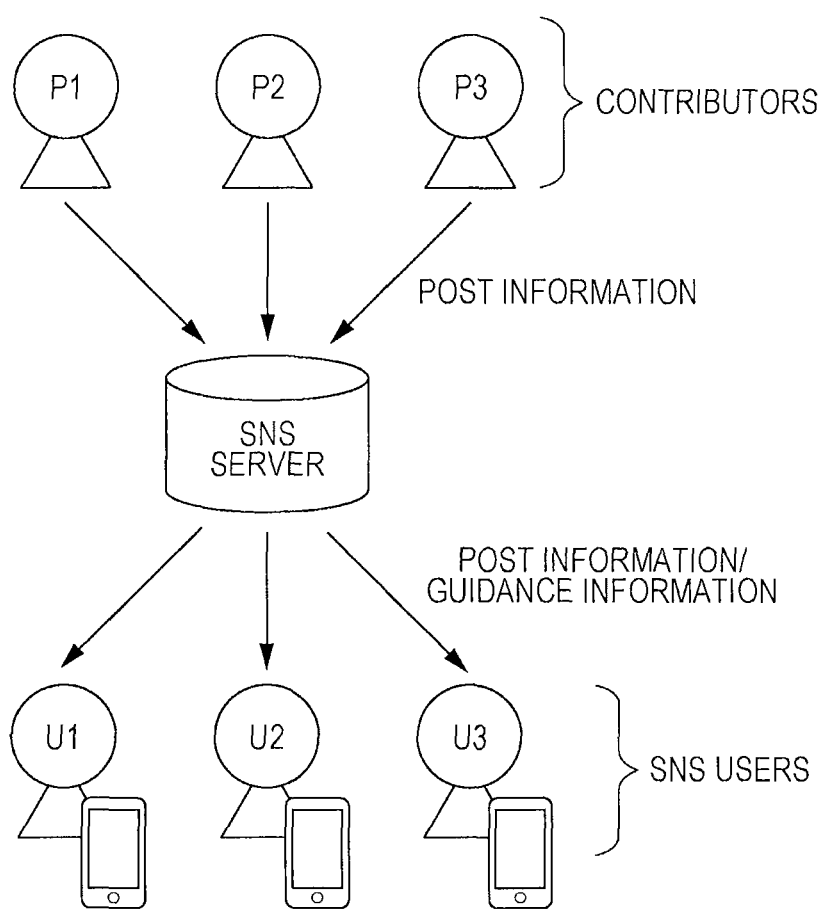
FIG. 1 illustrates an example of usage of a guidance system according to embodiments of the present invention.

A guidance system according to embodiments of the present invention will be described below with reference to the drawings. FIG. 1 illustrates an example of usage of a social networking service (SNS) implemented in the guidance system according to the embodiments. In FIG. 1, contributors P1, P2, and P3, such as an entertainer, a blogger, a famous person, or a celebrity, upload, as pieces of post information, pieces of information, such as pieces of word-of-mouth information they are interested in, onto an SNS server, and those pieces of post information are sequentially accumulated in a database DB of the SNS server. The contributors P1, P2, and P3 are preferably persons registered on this SNS in advance, and each have unique identification information. The contributors P1, P2, and P3 upload post information by using, for example, a smartphone.

On the other hand, users U1, U2, and U3 each access the SNS server via, for example, a smartphone, and download the pieces of post information from the SNS server. Application software for using this SNS is preferably installed on the smartphone. When this application is executed, access to the SNS server, download of the pieces of post information, display of the pieces of post information, and display of guidance information to a location specified in a piece of post information are performed. Preferably, each user causes the SNS server to authenticate his/her user account, then a request for distribution of the pieces of post information is transmitted to the SNS server, and the SNS server distributes the pieces of post information. The pieces of post information distributed to the smartphone are displayed on a display under the control of the application, and the users U1, U2, and U3 may browse the pieces of post information of the contributors P1, P2, and P3. Furthermore, the users U1, U2, and U3 may set, as a destination, a location contained in any piece of post information among the displayed pieces of post information. When the destination contained in the post information is set, the SNS server preferably searches for a guidance route to the destination and distributes guidance information necessary to provide guidance on the guidance route, and this guidance information is displayed or output by sound at a user's terminal. Preferably, the user U1 may select post information of a contributor which matches his/her taste, and select guidance using guidance information of this contributor.

Figure 2:
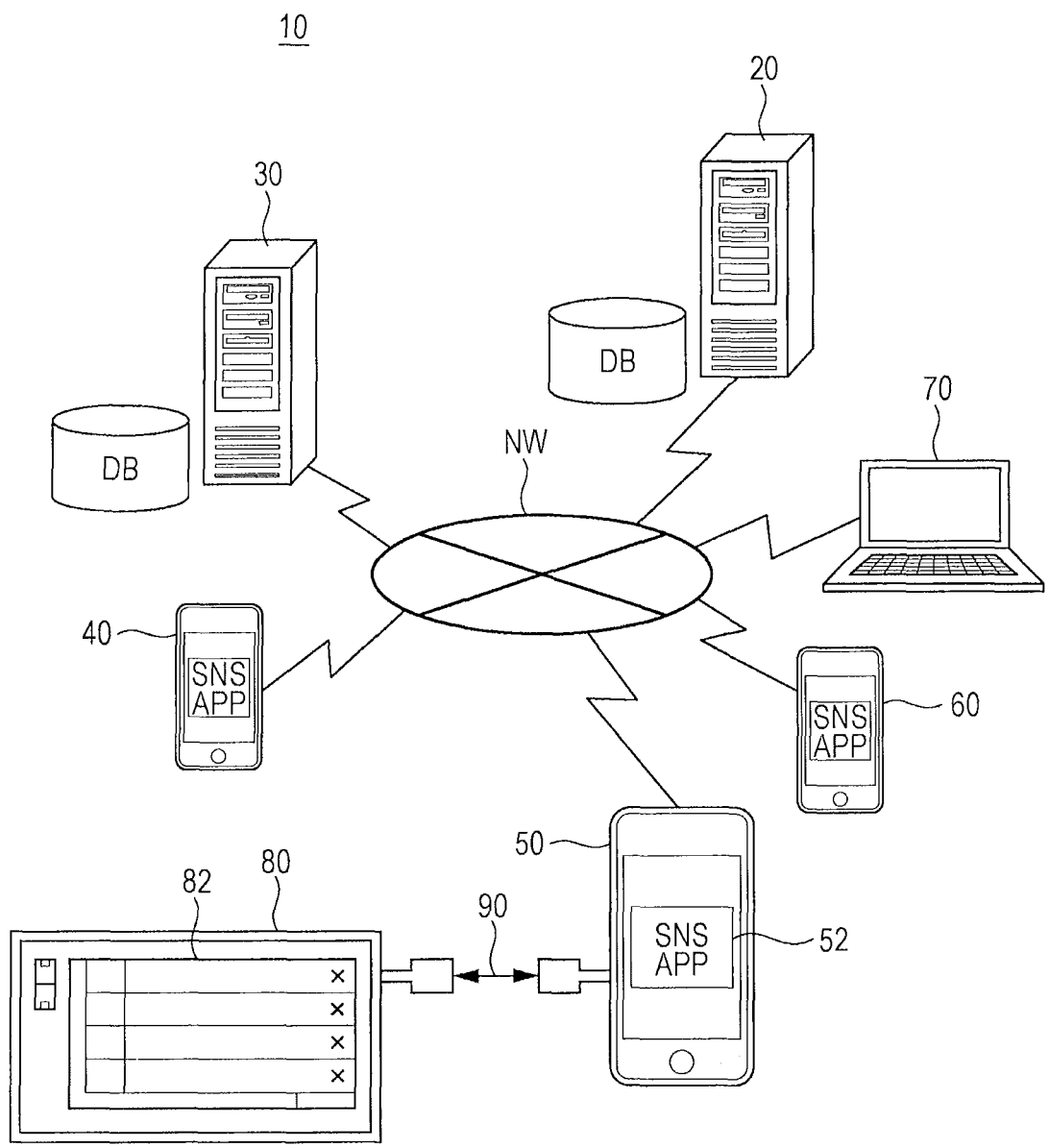
FIG. 2 illustrates an example of the configuration of the guidance system according to the embodiments of the present invention.

FIG. 2 illustrates an example of the configuration of the guidance system according to the embodiments. In a guidance system 10 according to the embodiments, SNS servers 20 and 30, smartphones 40, 50, and 60, a personal computer 70, and so forth are connected to a network NW, such as the Internet. A contributor may post post information onto the SNS server 20 or 30 via, for example, the smartphones 40 to 60, or the PC 70. On the other hand, an SNS user may also acquire post information and guidance information on a guidance route from the SNS server 20 or 30 via the smartphones 40 to 60, or the PC 70, and the post information and the guidance information may be displayed on his/her terminal. Also, in the case where the smartphone 50 is carried into a vehicle, the smartphone 50 may be connected to an in-vehicle device 80 with a connection device 90 using Universal Serial Bus (USB) communication, near field communication, or the like, and post information 82 and guidance information may be displayed on a display of the in-vehicle device 80. An SNS application 52 is preferably installed on the smartphones 40 to 60, and the SNS application 52 is executed when an SNS is used.

Figure 3:
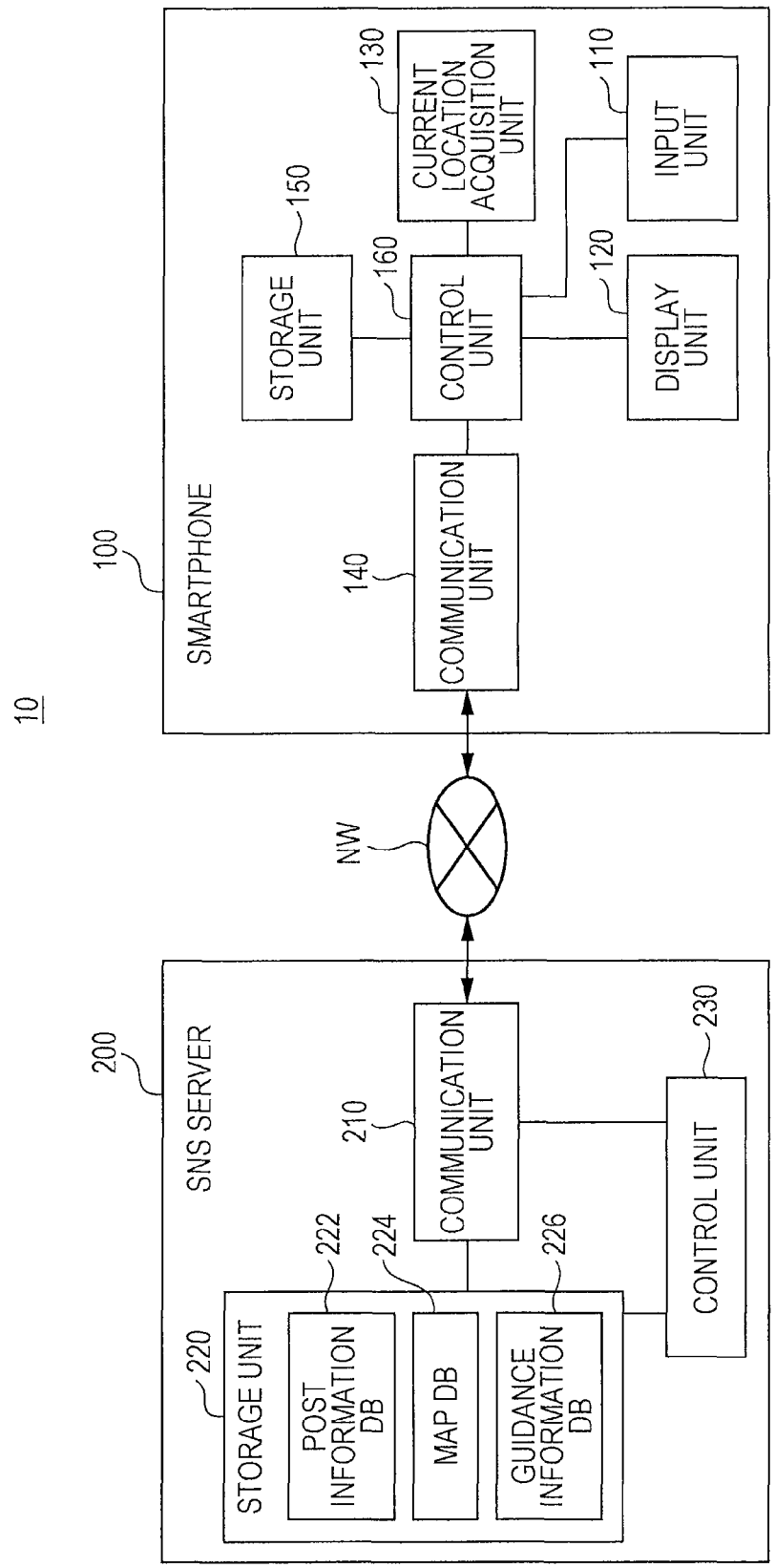
FIG. 3 illustrates an example of the internal configuration of the guidance system according to a first embodiment of the present invention.

FIG. 3 illustrates a specific example of the configuration of the guidance system 10 according to a first embodiment. In this embodiment, a contributor posts post information with a smartphone 100, and a user causes the smartphone 100 to display post information and also output guidance information on a guidance route to a location contained in the post information. As illustrated in FIG. 3, the smartphone 100 includes basic components, such as an input unit 110 with which an instruction from the user is input, a display unit 120, a current location acquisition unit 130 that calculates a current location of the smartphone 100, a communication unit 140 that performs data communication with a server or the like via the Internet or the like, a storage unit 150 that is capable of storing data, a program, and so forth, and a control unit 160 that controls each unit. The smartphone 100 further includes, for example, an imaging camera that captures an image, a microphone with which sound is input, and a speaker that outputs sound, which are not illustrated.

The control unit 160 includes a microcontroller, a central processor, or the like, and preferably executes application software or a program, which has been prepared in advance, so as to control the use of an SNS. In an embodiment, when the contributor visits a facility, such as a restaurant, a shop, or a hotel, the contributor posts word-of-mouth information, such as a text, a still image, and a moving image, regarding the facility.

Figures 4, 5:
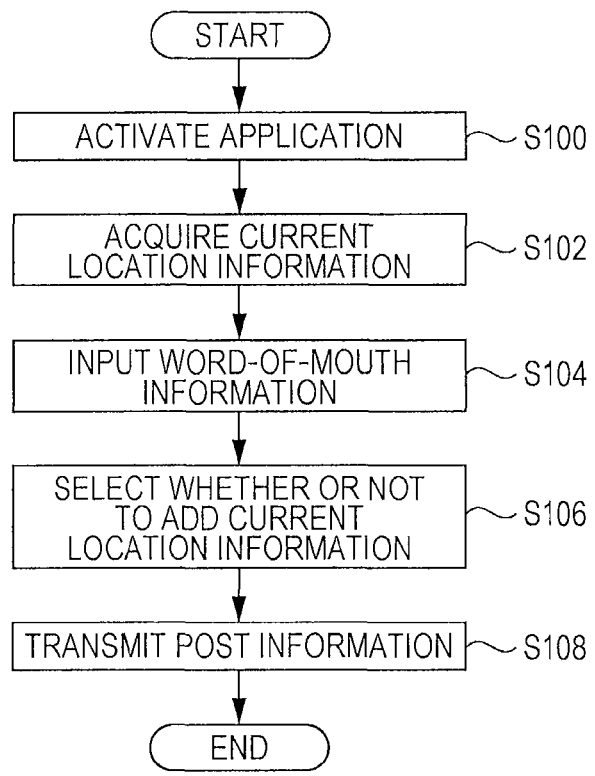
FIG. 4 is a flowchart illustrating an example of operations performed when post information is posted with a smartphone.
FIG. 5 illustrates an example of post information generated when a contributor makes a post, such as word-of-mouth information.

FIG. 4 is a flowchart illustrating operations for posting post information. The contributor activates an application of the smartphone 100 (S100). This activation enables the smartphone 100 to communicate with an SNS server 200. Preferably, as a condition for using the SNS, login using a user account, a password, or the like for user authentication is requested. Note that a point in time when user authentication is performed is not limited to this point in time, and user authentication may be performed when post information is transmitted.

In accordance with activation of the application, current location information of the smartphone 100 is acquired by the current location acquisition unit 130 (S102). As a method of acquiring current location information, a known method is used. For example, current location information is calculated from coordinate information on the latitude and longitude of a global positioning system (GPS) receiver when the smartphone 100 is equipped with the UPS receiver, or from location information of a self-contained navigation sensor, such as a gyro sensor or acceleration sensor, when the smartphone 100 includes the self-contained navigation sensor. Alternatively, in the case where the current location information of the smartphone 100 may be acquired externally via the communication unit 140, the current location information is used.

The contributor inputs word-of-mouth information via the input unit 110 (S104). When input is completed, the contributor selects whether or not to add the current location information by associating the current location information with post information (S106). Subsequently, when the contributor provides a transmission instruction, the post information is transmitted to the SNS server 200 (S108).

When word-of-mouth information is input by the contributor, the control unit 160 generates post information so as to transmit it to the SNS server 200. FIG. 5 illustrates an example of the post information. The post information contains a contributor ID, a post date and time, post content, and post location information. The contributor ID is information for identifying the contributor. For example, a user account, a user name, or the like which is used for authentication by the SNS server 200 may be used. Alternatively, information enabling identification of the contributor, for example, the phone number of a smartphone, or the like may be used. Here, the contributor P1, which is an owner of the smartphone 100, is illustrated. The post date and time is information regarding the time when the post information is transmitted. For example, information representing hour, minute, month, day, and the like is provided. As this information, clock information provided by a clock in the smartphone 100 may be used. The post content may contain text information input by the contributor, image information on an image captured by the contributor with the smartphone 100, and audio information input by the contributor with the smartphone 100. The image information and the audio information may be compressed by a known compression method so as to be processed into a Moving Picture Experts Group (MPEG) format, a Joint Photographic Experts Group (JPEG) format, or the like. As described above, the post location information is the current location information of the smartphone 100 acquired by the current location acquisition unit 130. The post information containing these pieces of information may be retained in the storage unit 150 of the smartphone 100 for a certain time period.

The post location information is not necessarily limited to location information acquired by the current location acquisition unit 130. In the above example of generating post information, as the post location information, a current location acquired by the current location acquisition unit 130 of the smartphone 100 is added to the post information illustrated in FIG. 5. However, actually, the contributor may visit a facility or the like and may not necessarily post post information there. That is, the contributor may post the post information from a PC at home or another place. In this case, the current location acquired by the current location acquisition unit 130 does not necessarily match a post location. Thus, location information contained in the post information may be information on a location other than the location acquired by the current location acquisition unit 130. For example, when post information is generated, map data that has been stored in the storage unit 150 of the smartphone 100 or a map distribution server is accessed, a facility or a location is selected from the map data, and the location of the facility or the location may be set as the post location information. Alternatively, when post information is generated, in the case where a still image or moving image regarding a facility (e.g., an image of the facility that was captured, or an image of products for sale or the like that was captured) is contained in the post content, the location at which each image was captured may be set as the post location information. Also, when post information is generated, a character string contained in the post content is compared with the map data that has been stored in the storage unit 150 of the smartphone 100 or the map distribution server, information representing a location, such as a facility name or address, is extracted, and the extracted location may be set as the post location information. Furthermore, the user may input an address or the like as the post location information by himself/herself. Thus, the post location information may be a current location acquired by the current location acquisition unit 130, location information stored in the map data, location information input by the user, or the like. The decision on the post location information is made in the operation of step S106 illustrated in FIG. 4. In the case where the post location information is changed to information of a location other than the current location acquired by the current location acquisition unit 130, the user may finally decide on the post location information.

An SNS server will be described below with reference to FIG. 3. The SNS server 200 includes, as basic components, a communication unit 210 that performs data communication with the smartphone 100 or the like via the network NW, a storage unit 220, and a control unit 230 that controls each unit. The communication unit 210 enables communication with a smartphone or another device in which an SNS application has been activated, via the Internet or an intranet, by using communication protocols, such as transmission control protocol/Internet protocol (TCP/IP). The storage unit 220 accumulates post information posted by the contributor, and includes a post information DB 222 compiled from the post information, a map DB 224 compiled from map data that is to be distributed to the smartphone 100 and the like which does not have map data, or that is used so as to search for a guidance route to a destination, and a guidance information DB 226 compiled from guidance information that is used to provide guidance on the guidance route and that contains an image and audio data of the contributor himself/herself. The control unit 230 includes a microcontroller, a central processor, or the like, and preferably executes application software or a program, which has been prepared in advance, so as to control the SNS, database construction, communication, and so forth.

Figures 6, 7:
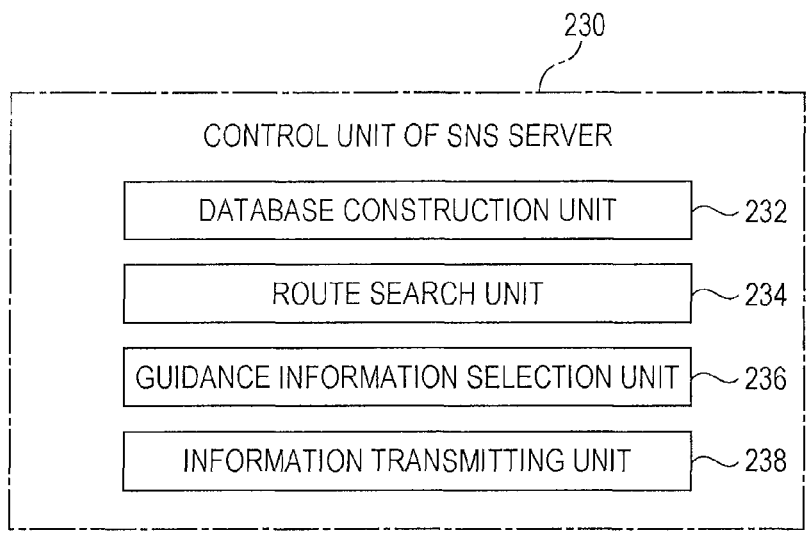
FIG. 6 is a block diagram illustrating a functional configuration of a control unit of an SNS server.
FIG. 7 illustrates an example of a post information database constructed in the SNS server.

FIG. 6 is a block diagram illustrating primary functions of the control unit 230 of the SNS server 200. The control unit 230 includes: a database construction unit 232 that constructs the post information DB 222, the map DB 224, and the guidance information DB 226; a route search unit 234 that searches for a guidance route to a destination when a location contained in post information is set as the destination by the user; a guidance information selection unit 236 that selects guidance information in accordance with, for example, the guidance route searched for by the route search unit 234; and an information transmitting unit 238 that transmits the post information and the guidance information.

When the database construction unit 232 receives pieces of post information posted by contributors, the database construction unit 232 accumulates them in sequence in the storage unit 220 and constructs the post information DB 222. FIG. 7 illustrates an example of the post information DB 222. Various pieces of post information posted by contributors P1 to Pn are registered in the post information DB 222. Each piece of post information contains a contributor ID, a post date and time, post content, and post location information. However, as in the last contributor P3, if the post location information has not been associated with the post information, the post information does not contain the post location information. The control unit 230 refers to such a database, searches for or sorts post information by using the contributor ID, the post date and time, or the like, or alternatively, may search for post content by using a keyword or the like. Setting of a flag is optional; however, the use of the flag may facilitate selection of post information.

FIG. 8A illustrates an example of pieces of guidance information contained in the guidance information DB 226 included in the storage unit 220 of the SNS server 200. The guidance information DB 226 has the following items: contributor ID, guidance direction, image file, and audio file. Image files and audio files are associated with guidance directions for each contributor and registered in the guidance information DB 226. As the guidance directions, basic elements: right turn, straight, and left turn, may be used. In addition to these, pieces of information on a U-turn, an oblique direction, arrival at destination, estimated time, and so forth may be used. Each image file contains image data representing a guidance direction presented by the contributor. For example, the image file is a still image that contains an image of the contributor himself/herself and an image of an arrow or the like representing a direction of travel. FIG. 8B illustrates an example of a still image of a guidance direction representing a left turn presented by the contributor P1. This still image contains images of the upper body of the contributor P1 himself/herself and an arrow AR representing a left turn direction. Similarly, FIG. 8C illustrates an example of a still image of a right turn direction, and FIG. 8D illustrates an example of a still image of a straight direction. Other than the still image, the image file may be a moving image representing a guidance direction presented by the contributor. Each audio file contains audio data representing a guidance direction provided by the voice of the contributor himself/herself. For example, in the case of left turn as in FIG. 8B, the audio file contains audio data, such as "turn left" provided by the voice of the contributor P1 himself/herself. Similarly, in the case of right turn and straight, audio data, such as "turn right" and "go straight" provided by the voice of the contributor himself/herself, is stored. In the case where the image file is a moving image, the audio file is not always necessary because audio data is contained in image data. These pieces of guidance information of the contributor are registered in the storage unit 220 of the SNS server 200, and the registration is made by the database construction unit 232. Furthermore, the database construction unit 232 may be caused to perform an operation, such as adding, removing, or changing guidance information via a terminal device, such as a smartphone.

The map DB 224 contains information, such as road map data and facility data. The road map data contains link data for identifying a road, intersection data representing an intersection, and so forth. The facility data contains points of interest (POIs), such as restaurants, gas stations, hotels, and sightseeing spots. In a preferred example, the road map data is managed for each map sheet having certain latitude and longitude widths, and necessary road map data on a map sheet-by-map sheet basis may be provided to the smartphone 100 which does not have a map DB.

The route search unit 234 refers to the map DB 224 and searches for a guidance route to a destination. In this embodiment, while pieces of post information are being displayed on the smartphone 100 and being browsed, the user may select a piece of post information so as to set a location contained in the piece of post information as a destination. When a post location is set as a destination, the smartphone 100 transmits the current location information of the smartphone 100 and the post location of the selected piece of post information (or information for identifying the selected piece of post information) to the SNS server 200. On the basis of this, the route search unit 234 searches for a guidance route to the post location of the piece of post information from the current location of the smartphone 100. Here, the post location is the location of a facility or the like which has been referred to by the piece of post information.

The guidance information selection unit 236 selects guidance information on the basis of the selected piece of post information and the guidance route searched for by the route search unit 234. Preferably, the guidance information selection unit 236 selects guidance information provided by a contributor who is the same as the contributor of the selected piece of post information, and also selects an image file and an audio file that represent a guidance direction corresponding to a junction, such as an intersection, on the guidance route. For example, when the user sets a location contained in the post information of the contributor P1 as a destination, the guidance information selection unit 236 selects the guidance information of the contributor P1 from the guidance information DB 226, and selects, from the guidance information, an image file and an audio file that match a guidance route.

The information transmitting unit 238 transmits post information to the smartphone 100 when the post information is requested from the smartphone 100, and transmits guidance information to the smartphone 100 when a post location contained in the post information is set as a destination. In the case where the smartphone 100 does not have a map DB, the information transmitting unit 238 transmits necessary map data to the smartphone 100.

Operations performed by the guidance system 10 according to this embodiment will be described below with reference to a flowchart illustrated in FIG. 9. In this embodiment, an SNS user uses the smartphone 100, and causes the smartphone 100 to display post information on the display unit 120 of the smartphone 100 and output guidance information on a guidance route.

The SNS user activates SNS application software in order to start use of an SNS in the smartphone 100 (S200). Because of this, user authentication is performed between the SNS server 200 and the smartphone 100 (S202). When the user authentication is completed, the control unit 160 requests, via the communication unit 140, the SNS server 200 to distribute post information (S204). Also, at the same time, the control unit 160 may request the SNS server 200 to distribute map data if its own smartphone does not have a map database. In this case, the control unit 160 transmits, to the SNS server 200, current location information of the smartphone 100 acquired by the current location acquisition unit 130 together with that request. The request for distribution of post information may be made at any point in time. Preferably, the request is automatically made by the SNS application, or alternatively, may be made in accordance with an instruction from the user.

When the SNS server 200 receives the request for distribution of post information and/or the current location information via the communication unit 210 (S206), the control unit 230 transmits pieces of post information accumulated in the post information DB 222 to the smartphone 100 (S208). At this time, the control unit 230 may restrict post information to be transmitted to information that satisfies a certain condition. For example, the post information may be restricted to post information of a specific contributor, post information containing a location at a certain distance from a current location of the smartphone 100, post information posted within a certain time period from a current time, or the like. The certain condition may be preset; alternatively, an instruction on the certain condition may be provided by the user via the input unit 110 of the smartphone 100. For example, the user may instruct the SNS server 200 to transmit post information of the contributor P1 that has been posted within 24 hours from the current time and contains a location within a radius of 5 Km of the current location.

Figures 10A, 10B:
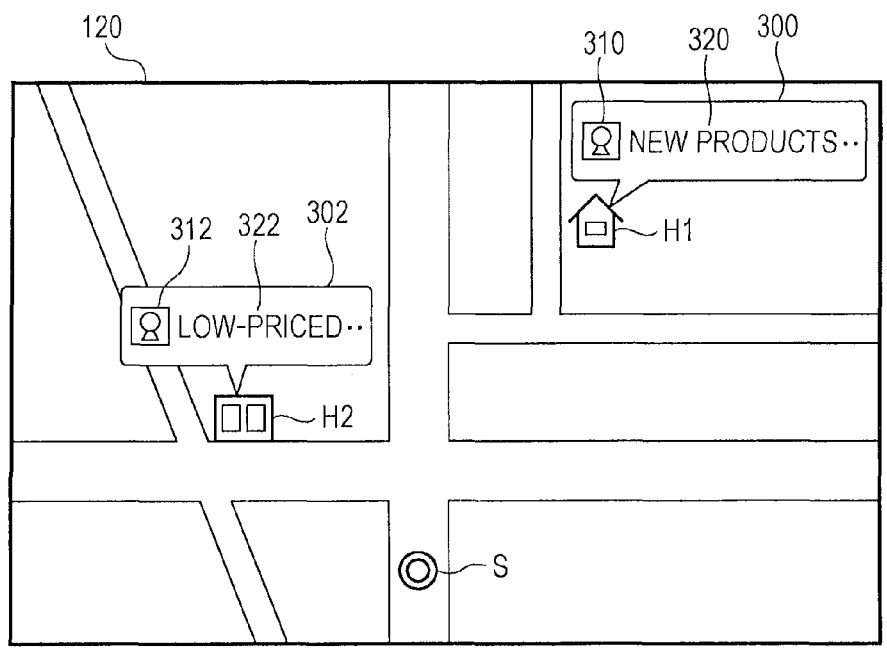
FIG. 10A illustrates an example where pieces of post information are displayed on a map.
FIG. 10B illustrates an example where the pieces of post information are displayed in list form.

When the smartphone 100 receives the pieces of post information, the smartphone 100 displays these pieces of post information on the display unit 120 (S210). FIG. 10A illustrates an example where the pieces of post information are displayed on a map, and FIG. 10B illustrates an example where the pieces of post information are displayed in list form. As illustrated in FIG. 10A, a map of the area around a current location S is displayed on the display unit 120 of the smartphone 100, and the distributed pieces of post information are displayed on the map. As the pieces of post information, for example, bubbles 300 and 302 are indicated at facilities H1 and H2 corresponding to respective post locations. Inside the bubbles 300 and 302, head shots 310 and 312 from which contributors may be identified, and pieces of post content 320 and 322 are indicated. This display form is an example, and an icon may be indicated at a location at which post information exists. When the user selects the bubble 300 or 302, a menu is displayed, and when the user selects a display of all the pieces of post information from the menu, a screen from which the user is able to browse all the pieces of post information as illustrated in FIG. 10B is displayed. In the case where the smartphone 100 does not have a map DB, the smartphone 100 transmits the current location information to the SNS server 200, and the SNS server 200 may distribute map data of the area around the current location to the smartphone 100.

In the display form illustrated in FIG. 10B, the pieces of post information are displayed in list form on the display unit 120 of the smartphone 100. The pieces of post information are arranged in a list, and a contributor image 340 for identifying each contributor, post content 350, a post location 360, and destination setting 370 are indicated in each piece of post information. A scroll bar 380 for scrolling the list of the pieces of post information is also indicated. The pieces of post information may be arranged in order of increasing distance from the current location, or in order of contributor ID. This display form is implemented in a smartphone or the like which does not have a map DB. In some smartphones, switching to a map screen, like the map screen illustrated in FIG. 10A, may be performed by selecting the post location 360 in the list.

When the user selects a piece of post information on the display screen illustrated in FIG. 10A, a pop-up menu is displayed there. The user may select destination setting from the menu so as to set, as a destination, a post location, such as the facility H1 or H2, to which the piece of post information refers. On the other hand, on the list display screen illustrated in FIG. 10B, the user may select the destination setting 370 of an intended piece of post information so as to set a post location of this piece of post information as a destination.

In this way, when the post location contained in the piece of post information is set as the destination by selecting the piece of post information (S212), the current location S is acquired by the current location acquisition unit 130 (S214), current location information and information for identifying the selected piece of post information are transmitted from the smartphone 100 to the SNS server 200, and a request for guidance information on guidance to the destination is made. If the current location information of the smartphone 100 has already been transmitted to the SNS server 200 together with a request for distribution of map data or the like, a process in step S214 and transmission of the current location information are unnecessary.

The route search unit 234 responds to the request for guidance information so as to search for a guidance route from the current location S to the post location of the selected piece of post information with reference to the map DB 224 (S216). Subsequently, the guidance information selection unit 236 selects guidance information in accordance with the selected piece of post information and the searched-for guidance route (S218). Preferably, the guidance information selection unit 236 selects guidance information of a contributor who is the same as the contributor of the selected piece of post information. For example, in FIG. 10A, in the case where the post information on the facility H1 is set as a destination, guidance information of a contributor corresponding to the contributor who has posted the post information and is denoted by the head shot 310 is selected.

The information transmitting unit 238 transmits searched-for guidance route information and/or the guidance information to the smartphone 100. In some cases, the smartphone 100 provides guidance to the destination using a map display, and in some cases, the smartphone 100 provides guidance to the destination without using a map display. Selection of whether or not to use a map display is finally decided by the user. In the case where the smartphone 100 provides the guidance using a map display, the smartphone 100 draws the guidance route on the map, and also displays the current location S on the map. In the case where the control unit 230 of the SNS server 200 has a map matching function, map data obtained by combining the guidance route and the current location with the map may be transmitted to the smartphone 100. In the case where the control unit 160 of the smartphone 100 has a map matching function, map data obtained by combining the guidance route and the current location with the map may be generated in the smartphone 100.

When the smartphone 100 receives the guidance information, the smartphone 100 starts to provide guidance on the guidance route to the destination (S220). In this embodiment, because the route search unit 234 and the guidance information selection unit 236 monitor the current location S of the smartphone 100 at all times, the smartphone 100 transmits current location information acquired by the current location acquisition unit 130 to the SNS server 200 at certain time intervals, for example. The guidance information selection unit 236 selects necessary guidance information on the basis of updated current location information (S222), and transmits it to the smartphone 100. In addition, the route search unit 234 determines whether or not the current location S of the smartphone 100 has deviated from the guidance route, that is, whether or not an off-route condition has occurred. When it is determined that an off-route condition has occurred, the route search unit 234 re-searches for a guidance route to the destination. In the case where a guidance route is re-searched for, the guidance information selection unit 236 re-selects guidance information on the basis of the re-searched-for guidance route. The information transmitting unit 238 transmits the re-searched-for guidance route and the guidance information to the smartphone 100, and the smartphone 100 provides guidance using those pieces of information. Thus, guidance to the destination is provided (S224).

Figures 11A, 11B:
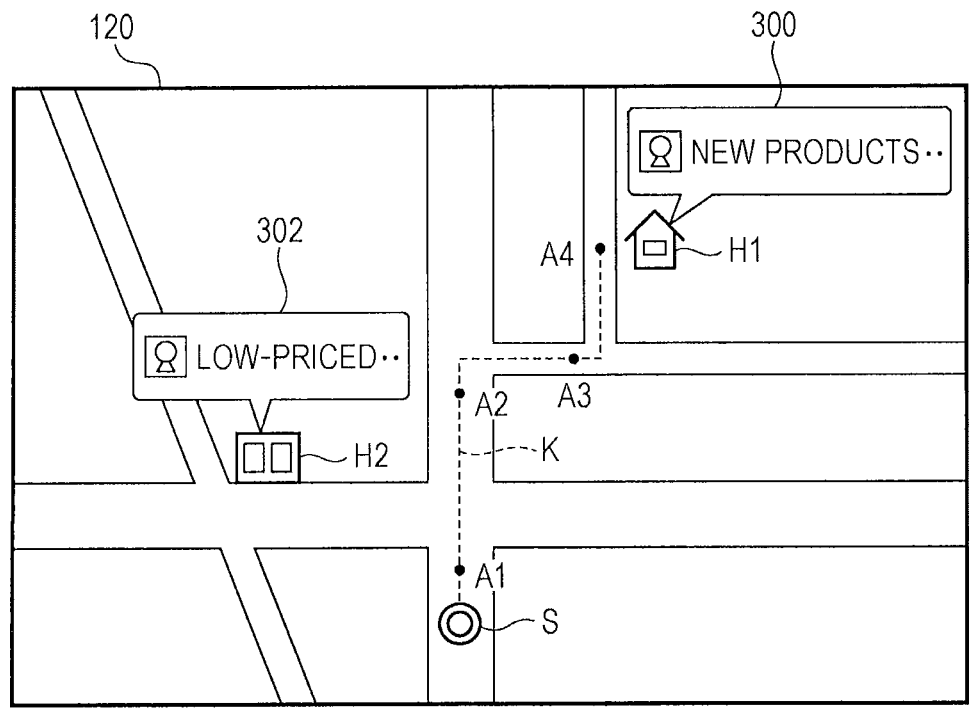
FIG. 11A illustrates an example of a search result of a route to a post location, which is a destination.
FIG. 11B illustrates an example of pieces of guidance information to be selected on the route in FIG. 11A.

FIG. 11A illustrates an example where guidance on a guidance route obtained when the location contained in the post information represented by the bubble 300 illustrated in FIG. 10A is selected as a destination is provided. On the map, a guidance route K from the current location S to the facility H1, which is a destination, is drawn on the basis of the guidance route information transmitted from the SNS server 200. A display location of the current location S is updated by map matching as the current location S moves.

Points A1, A2, A3, and A4 on the guidance route K denote points in time when respective pieces of guidance information are provided, and FIG. 11B illustrates the pieces of guidance information on guidance directions that are to be selected at the respective points in time. When the current location S gets to the point A1, the guidance information selection unit 236 selects an image file and an audio file that represent a straight direction as a guidance direction, and these files are transmitted to the smartphone 100. On the display unit 120 of the smartphone 100, a guidance screen that contains an image of the contributor and an arrow representing the straight direction is displayed as illustrated in FIG. 8D, and also audio guidance is output. The map screen remains switched to the guidance screen only for a certain time period; alternatively, the guidance screen is displayed together with the map screen, that is, two screens are displayed. When the current location S gets to the point A2, the guidance information selection unit 236 selects an image file and an audio file that represent a right turn direction as a guidance direction. On the display unit 120 of the smartphone 100, a guidance screen that contains an image of the contributor and an arrow representing the right turn direction is displayed as illustrated in FIG. 8C, and also audio guidance is output. Similarly, as for the point A3, an image file and an audio file that represent a left turn direction are selected, and they are output on the smartphone 100. When the current location S of the smartphone 100 gets to the point A4 near the destination, an image file and an audio file that represent arrival at the destination are selected, and a report on the arrival at the destination is output by using an image and voice of the contributor.

Figure 12:
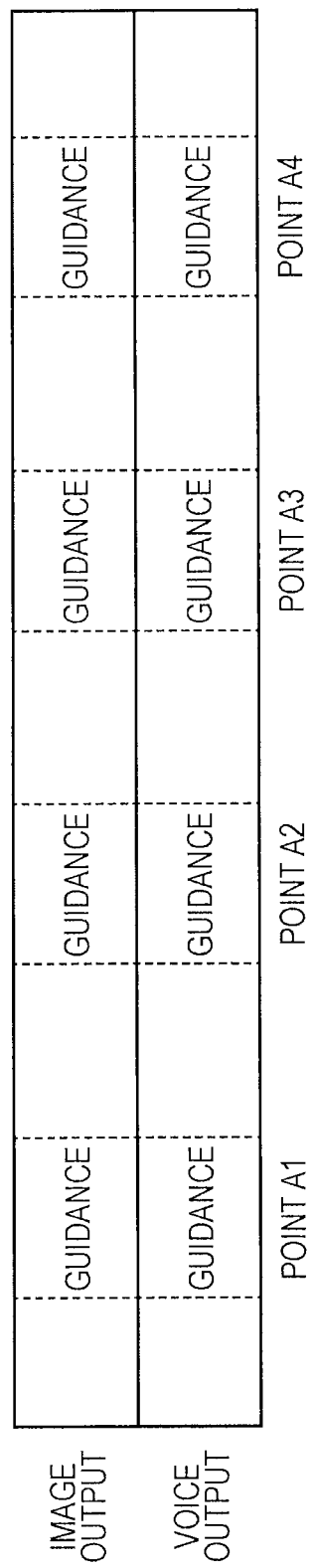
FIG. 12 illustrates an example where the pieces of guidance information are output as interrupts.

Some examples of an output form of guidance information will be described below. In the above example, guidance information is output while the guidance route K is being displayed on the map; however, the smartphone 100 may simply display only guidance information without displaying a map. In this case, as illustrated in FIG. 12, when the current location S gets to the points A1, A2, A3, and A4, guidance screens and guidance voices that represent straight, right turn, left turn, and arrival at the destination are output as interrupts, respectively. During a time period other than the above points, another image may be displayed on the display unit 120 and another voice may be output. Alternatively, when the current location S gets to the point A2, the guidance screen at the point A1 is switched to the guidance screen at the point A2, and thus the guidance screens may be displayed on the display unit 120 at all times.

Because it is convenient for the user to be able to check a distance to or a time period taken to get to a next guidance point, when guidance information is output at the point A1, a distance to the next point A2 or an estimated time period taken to get to the point A2 may be output at the same time. In this case, the distance and/or the estimated time period may be output by using either an image or a voice, and there may be prepared, in the guidance information DB 226 of the SNS server 200, in advance, an image file and/or an audio file of the contributor himself/herself that represent/represents a time period or a distance.

In this embodiment, the example is provided in which guidance information provided by a contributor who is the same as a contributor of selected post information is selected; alternatively, a contributor of guidance information may be changed in accordance with an instruction from the user. For example, in the case where the user instructs the SNS server 200 to select guidance information provided by the contributor P2 when post information is post information posted by the contributor P1, the guidance information selection unit 236 may select the guidance information provided by the contributor P2.

A second embodiment of the present invention will be described below. In the first embodiment, the example is provided in which the SNS server 200 monitors the current location S of the smartphone 100 at all times, selects guidance information in accordance with the current location S, and transmits the selected guidance information to the smartphone 100. In the second embodiment, the control unit 160 of the smartphone 100 receives route information and guidance information at one time from the SNS server 200, and provides guidance to a destination by performing its own navigation function. FIG. 13 is a flowchart illustrating operations performed in the second embodiment.

Steps S300 to S314 are the same as steps S200 to S214 in FIG. 9, and description thereof is omitted. The route search unit 234 searches for a guidance route from the current location S of the smartphone 100 to a post location contained in post information (S316), and the guidance information selection unit 236 selects guidance information on the basis of the searched-for guidance route (S318). In the second embodiment, the guidance information selection unit 236 selects pieces of guidance information at all guidance points on the guidance route. For example, if the examples in FIGS. 11A and 11B are used, the guidance information selection unit 236 selects all the pieces of guidance information at the points A1 to A4 on the guidance route K. Subsequently, the information transmitting unit 238 transmits route information and the pieces of guidance information associated with all the guidance points at one time to the smartphone 100.

When the smartphone 100 receives the route information and the pieces of guidance information, the smartphone 100 stores them in the storage unit 150. Furthermore, as illustrated in FIG. 11A, the smartphone 100 combines the guidance route K with the map so as to draw it on the map, and starts to provide guidance to the destination (S320). The control unit 160 of the smartphone 100 performs its own navigation function, and performs map matching of the current location S to the map on the basis of current location information acquired by the current location acquisition unit 130. Then, when the current location S gets to the points A1 to A4, the control unit 160 reads the respective pieces of guidance information corresponding to the guidance points A1 to A4 from the storage unit 150, and provides guidance using an image and voice of the contributor as in the first embodiment.

The control unit 160 monitors whether or not the current location S has deviated from the guidance route (S322). When the control unit 160 determines that the current location S has deviated from the guidance route, the control unit 160 transmits the current location information to the SNS server 200 and also makes a request to the SNS server 200 for a re-search for a guidance route. In response to this, the route search unit 234 re-searches for a route from a received current location to the destination (S324), the guidance information selection unit 236 re-selects pieces of guidance information on the basis of the re-searched-for guidance route (S326), and the information transmitting unit 238 transmits re-searched-for guidance route information and the re-selected pieces of guidance information to the smartphone 100. Thus, the control unit 160 provides guidance to the destination (S328).

A third embodiment of the present invention will be described below. In the third embodiment, the smartphone 100 includes a map DB in the storage unit 150, and the control unit 160 searches for a guidance route to a destination with reference to its own map DB, and receives, from the SNS server 200, guidance information at a guidance point on the guidance route. FIG. 14 is a flowchart illustrating operations performed in the third embodiment. Operations of steps S400 to S414 are the same as those in FIG. 9, and description thereof is omitted. In the third embodiment, when a location contained in post information is set as a destination by the user (S412), the current location S of the smartphone 100 is acquired by the current location acquisition unit 130 (S414), and the control unit 160 searches for a guidance route from the current location S to the destination with reference to its own map DB (S416). Subsequently, the control unit 160 makes a request to the SNS server 200 for guidance information on the basis of the searched-for guidance route. This request contains searched-for guidance route information. For example, when the guidance route K illustrated in FIG. 11A is searched for, the control unit 160 transmits information on the guidance route K to the SNS server 200.

The guidance information selection unit 236 responds to the request, which contains the guidance route information, for transmission of guidance information so as to select guidance information on the basis of the received guidance route information (S418), and the selected guidance information is transmitted to the smartphone 100. When the control unit 160 receives the guidance information, the control unit 160 starts to provide guidance to the destination (S420). The control unit 160 displays the current location S on the map by map matching as the smartphone 100 moves. When the current location S deviates from the guidance route, the control unit 160 re-searches for a route to the destination with reference to the map DB (S422). In the case where a different route is re-searched for, the control unit 160 transmits re-searched-for guidance route information to the SNS server 200 and also makes another request to the SNS server 200 for guidance information. The guidance information selection unit 236 re-selects guidance information on the basis of the re-searched-for guidance route information (S424), and the re-selected guidance information is transmitted to the smartphone 100. Such processing is performed, and route guidance to the destination is provided (S426).

In the above embodiments, the example where the smartphone 100 receives guidance information transmitted from the SNS server 200 is provided; alternatively, the smartphone 100 may store guidance information in the storage unit 150.

In the smartphone 100, a database of guidance information of a contributor that was previously used may be compiled and retained so as to use that guidance information. If guidance information that has not been retained in the storage unit 150 of the smartphone 100 is required, a request for transmission of the guidance information is made to the SNS server 200. This enables a reduction in data traffic between the smartphone 100 and the SNS server 200. In addition, the smartphone 100 may retain data on guidance information synchronized with the guidance information DB 226 stored in the SNS server 200. In this case, the smartphone 100 may provide guidance to the destination by using the guidance information that the smartphone 100 has.

In the first to third embodiments, the example where a post location contained in post information is a current location at which a contributor has made a post on an SNS server is provided. However, in the case where a post location has not been assigned, a character string contained in post content is compared with a map DB, information representing a location, such as a facility name or address, is extracted, and that location may be used as the post location.

The first to third embodiments of the present invention have been described in detail; however, these embodiments may be appropriately combined. Also, the present invention is not limited to the first to third embodiments. While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A guidance system comprising: a server that is capable of distributing guidance information; and a terminal device that provides the guidance information from the server,
   wherein the server includes
      a receiving unit that receives pieces of post information which are each posted by a contributor and each contain at least information on a location,
      an accumulation unit that accumulates the received pieces of post information,
      a storage unit that stores guidance information which contains image information representing an appearance of the contributor or audio information of the contributor,
      a selection unit that selects the guidance information, and
      a transmitting unit that transmits, to the terminal device, the pieces of post information and the guidance information selected by the selection unit, and
   wherein the terminal device includes
      a request unit that makes a request to the server for transmission of the pieces of post information and the guidance information,
      a post information display unit that displays the pieces of post information which have been transmitted by the transmitting unit in response to the request unit,
      a setting unit that sets, as a destination, a location contained in a piece of post information among the displayed pieces of post information, and a guidance unit that provides, by using the guidance information, guidance on a guidance route to the location set as the destination.

2. The guidance system according to claim 1, wherein the selection unit selects guidance information of a contributor of the piece of post information containing information on the location set as the destination by the setting unit.

3. The guidance system according to claim 1, wherein the terminal device includes an input unit that receives an input from a user, and the selection unit selects guidance information of a contributor selected via the input unit.

4. The guidance system according to claim 1, wherein the guidance information contains the image information or the audio information for each of guidance directions, and the selection unit selects image information or audio information of an appropriate guidance direction in accordance with the guidance route.

5. The guidance system according to claim 1, wherein the server includes a search unit that searches for the guidance route to the location set as the destination by the setting unit.

6. The guidance system according to claim 5, wherein the selection unit selects guidance information in accordance with the guidance route searched for by the search unit.

7. The guidance system according to claim 5, wherein the transmitting unit transmits, at one time, the guidance route searched for by the search unit and all pieces of guidance information to the destination.

8. The guidance system according to claim 5, wherein the search unit monitors a current location of the terminal device, and, when the current location of the terminal device deviates from the guidance route, the search unit re-searches for a guidance route to the destination, and the selection unit selects guidance information in accordance with the re-searched-for guidance route.

9. The guidance system according to claim 1,
wherein the terminal device further includes a retaining unit that retains the guidance information, and, when guidance information of a contributor of the piece of post information containing information on the location set as the destination by the setting unit is not contained in the retaining unit, the request unit makes a request to the server for transmission of the guidance information of the contributor, and
wherein the selection unit selects the guidance information in response to the request.

10. The guidance system according to claim 1, wherein the terminal device further includes a search unit that searches for the guidance route to the location set as the destination by the setting unit.

11. The guidance system according to claim 1, wherein the image information contains a still image containing both a face of the contributor and a guidance direction.

12. The guidance system according to claim 11, wherein the contributor is a predetermined person.

13. A server that distributes guidance information to a terminal device, the server comprising:
a receiving unit that receives pieces of post information which are each posted by a contributor and each contain at least information on a location;
an accumulation unit that accumulates the received pieces of post information;
a storage unit that stores guidance information which contains image information representing an appearance of the contributor or audio information of the contributor;
a selection unit that selects the guidance information; and
a transmitting unit that transmits, to the terminal device, the pieces of post information and the guidance information selected by the selection unit,
wherein the selection unit selects guidance information to be provided on a guidance route to a location that has been set as a destination by the terminal device and is contained in a piece of post information.

14. The server according to claim 13, wherein the selection unit selects guidance information of a contributor of the piece of post information containing information on the location set as the destination.

15. A terminal device that is capable of providing guidance information distributed from a server, the terminal device comprising:
a request unit that makes a request to the server for transmission of pieces of post information which each contain at least information on a location, and guidance information;
a post information display unit that displays pieces of post information which have been transmitted by the server in response to the request unit;
a setting unit that sets, as a destination, a location contained in a piece of post information among the displayed pieces of post information; and
a guidance unit that provides, by using guidance information transmitted by the server, guidance on a guidance route to the location set as the destination,
wherein the guidance information contains image information representing an appearance of a contributor of the piece of post information containing information on the location set as the destination, or audio information of the contributor.

16. A guidance method of a guidance system including a server that is capable of distributing guidance information and a terminal device that provides the guidance information from the server, the guidance method comprising the steps of:
with the server,
(a) receiving pieces of post information which are each posted by a contributor and each contain at least information on a location;
(b) accumulating the received pieces of post information;
(c) storing guidance information which contains image information representing an appearance of the contributor or audio information of the contributor;
(d) selecting the guidance information;
(e) transmitting, to the terminal device, the pieces of post information and the selected guidance information;
with the terminal device,
(f) making a request to the server for transmission of the pieces of post information and the guidance information;
(g) displaying the pieces of post information which have been transmitted by the step (e) in response to the step (f);
(h) setting, as a destination, a location contained in a piece of post information among the displayed pieces of post information; and
(i) providing, by using the guidance information, guidance on a guidance route to the location set as the destination.

* * * * *